(12) United States Patent
Schenk

(10) Patent No.: US 11,104,609 B2
(45) Date of Patent: Aug. 31, 2021

(54) METHOD AND DEVICE FOR INTEGRATING GEMSTONES IN GLASS

(71) Applicant: Natascha Schenk, Kalsdorf (AT)

(72) Inventor: Natascha Schenk, Kalsdorf (AT)

(*) Notice: Subject to any disclaimer, the term of this patent is extended or adjusted under 35 U.S.C. 154(b) by 154 days.

(21) Appl. No.: 16/420,228

(22) Filed: May 23, 2019

(65) Prior Publication Data

US 2019/0276357 A1    Sep. 12, 2019

Related U.S. Application Data

(63) Continuation-in-part of application No. PCT/IB2017/000890, filed on Jul. 28, 2017.

(51) Int. Cl.
| | | |
|---|---|---|
| *C03C 27/00* | (2006.01) | |
| *A44C 17/04* | (2006.01) | |
| *A44C 27/00* | (2006.01) | |
| *C03B 23/207* | (2006.01) | |
| *C03B 17/02* | (2006.01) | |

(52) U.S. Cl.
CPC ............. *C03C 27/00* (2013.01); *A44C 17/04* (2013.01); *A44C 27/00* (2013.01); *C03B 23/207* (2013.01); *A44C 17/043* (2013.01); *C03B 17/025* (2013.01)

(58) Field of Classification Search
CPC ..... C03C 27/00; C03B 23/207; C03B 17/025; A44C 17/04; A44C 17/00; A44C 17/043; A44C 17/02; G01N 33/381
See application file for complete search history.

(56) References Cited

U.S. PATENT DOCUMENTS

| | | | |
|---|---|---|---|
| 5,271,132 A | 12/1993 | Pepper et al. | |
| 6,060,011 A | 5/2000 | Zandvliet et al. | |
| 8,789,251 B2* | 7/2014 | Labow | A44C 17/02 29/10 |
| 2011/0030422 A1 | 2/2011 | Kang | |
| 2013/0329212 A1* | 12/2013 | High | G06F 3/0484 356/30 |
| 2015/0015877 A1* | 1/2015 | Smith | G01N 33/381 356/300 |

FOREIGN PATENT DOCUMENTS

| | | | |
|---|---|---|---|
| FR | 641049 | 7/1928 | |
| WO | 2006128208 A1 | 12/2006 | |
| WO | WO-2006128208 A1 * | 12/2006 | ........... C03B 17/025 |

OTHER PUBLICATIONS

Schenk, WO 2006/128208 Machine translation (Year: 2006).*

* cited by examiner

*Primary Examiner* — Lee A Holly
(74) *Attorney, Agent, or Firm* — Laurence A. Greenberg; Werner H. Sterner; Ralph E. Locher

(57) ABSTRACT

A method and a device for encasing gemstones, such as diamonds, in glass. In order for their optical effects and appearance to be maximized, the gemstones are placed at a defined position and at a defined orientation. A suction cannula is provided for that purpose with an opening to fit the gemstone and to hold the gemstone by vacuum. Guide elements, such as spirals or meshes, are carried on the suction cannula so as to assure even distancing from the walls of the glass tube into which the gemstone is inserted.

8 Claims, 1 Drawing Sheet

METHOD AND DEVICE FOR INTEGRATING GEMSTONES IN GLASS

CROSS-REFERENCE TO RELATED APPLICATION

This application is a continuation-in-part, under 35 U.S.C. § 120, of copending international application No. PCT/IB2017/000890, filed Jul. 28, 2017, which designated the United States. The prior application is herewith incorporated by reference in its entirety.

BACKGROUND OF THE INVENTION

Field of the Invention

The present invention relates to a method of producing jewelry. More particularly, the invention pertains to a method and a device for encasing gemstones, such as diamonds, in glass to enhance their appearance in terms of size and reflectivity.

For to underline refection and light breaking abilities of gemstones, these need to be located at a (small) distance from the surface of the wearer in order to allow lighting not only frontally, but also incidence of light from the sides. Goldsmiths take this into consideration and place the most brilliant gems on top of crowns or they use only very sparse skirting. Even more effective is to encase gems in a glass ball or tear, whereupon the glass enclosure also enlarges the gem optically.

This, however, is not an easy task. As shown in my earlier international patent application WO 2006/128208 A1, heated gems are dropped into a half-molten glass tube and then the glass is further heated up by gas flames to completely melt and therewith close the tube to form a ball or a tear-shaped glass encasing. The disclosure of my earlier publication is herewith incorporated by reference.

The primary issue with the integration is that the optical effect is only strong when the gem is on all sides closely encompassed by the glass without leaving voids and also that the axis of the cut and polished stone is perfectly vertical in the case of non-helical encasements. This however cannot be provided by a randomly dropped gem into a glass tube, as done contemporarily, which results in varying qualities of the product and in a high rate of waste.

U.S. Pat. No. 6,060,011 B2 proposes to encase an object, such as a clay figurine, in a low-melting glass substrate and to cure it in the encapsulation mass. Whereas this method has the advantage of use in a production line and therefore high productivity, the results of melting glass substrates and the self-forming of spheres or tears just by capillary tension leads to quite random forms and results. In the context of precious gems, such an encapsulation process would lead to an intolerable amount of waste.

United States patent application US 2011/0030422 A1 discloses a method for mounting a jewels and/or noble metal in glass. The jewel is placed in a mold, molten glass is injected, the product is cooled and demolded, and then the product is polished. The process of demolding without traces on the glass surface is critical and thus polishing is cumbersome. Moreover, the exact positioning of the encased object hitherto was only possible by means of some kind of frame or base, that either is retained as a holder for a necklace, a bracelet, or the like, or the frame or base is removed. In the former option, undesirable voids may remain in the encasement. In the latter option, the frame or base has to be removed, which makes the polishing job more complicated and cumbersome.

BRIEF SUMMARY OF THE INVENTION

It is therefore an object of the invention to provide for a method for injecting gem stones so that they are perfectly positioned and then incorporating them in the glass matrix. However, quite a few attempts to inject them with tweezers or forceps have failed to provide a reliable result.

With the above and other objects in view there is provided, in accordance with the invention, a method of integrating a gemstone in a glass carrier, the method comprising the following steps:

providing a glass body with an opening;

aspirating the gemstone onto a head of a cannula by applying suction at an opposite end and establishing a vacuum at the head of the cannula;

heating a base of the body of glass to a temperature at which the base becomes malleable;

inserting the head of the cannula, with the gemstone aspirated thereon, through the opening in the glass body, and seating the gemstone in the malleable base;

further heating the base and separating the base with the gemstone integrated therein from a remaining portion of the glass body.

In accordance with an added feature of the invention, after the gemstone is seated in the malleable base, the vacuum at the head of the cannula is interrupted and the head of the cannula is withdrawn without the gemstone.

The method further comprises, after separating the base, further processing the separated base to form a final product being a glass figure with the gemstone incorporated therein. In a preferred implementation of the novel process, the glass figure is a sphere with the gemstone centrally disposed inside the sphere.

There might be an opening valve on that cone, that releases the vacuum as soon as the adequate depth is reached, so to place the gem without delay.

Once more in summary, for positioning gemstones that need to be encased into glass exactly so to achieve maximum optical effect, the invention provides for a suction cannula which has an opening to fit the gemstone and elements like spirals or meshes to provide even distancing from the walls of the glass tube into which it is inserted.

With the above and other objects in view there is also provided, in accordance with the invention, a cannula device, comprising:

an elongated hollow tube having a first end and a second end, the hollow tube being formed of a heat-resistant material that is resistant to temperatures used in a glass-blowing process;

a head piece disposed on the first end, the head piece having a shape corresponding to a shape of a gemstone to be carried by the head piece, and the head piece having an opening formed therein communicating with the second end of the hollow tube;

a plurality of spacers carried on the hollow tube and configured to guide the hollow tube centrally in an opening of a glass tube, for placing the gemstone carried by the head piece in a bottom of the glass tube;

the spacers being formed of a heat-resistant material that is resistant to the temperatures used in the glass-blowing process.

In accordance with various advantageous features of the invention, the shape of the head piece corresponds to the shape of a diamond, for instance of a 58 facet cut.

Preferably, the spacers are formed of polytetrafluoroethylene (PTFE), and the elongated hollow tube is a steel tube or a glass tube.

In accordance with a concomitant feature of the invention, there is provided a hilt at the second end of the hollow tube. The hilt has a shape corresponding to a shape of an entry opening into the glass tube. Further, the hollow tube has a length substantially equal to a length of said glass tube, such that, when the end piece is fully inserted into the glass tube and the gemstone is seated in the base of the glass tube, the hilt comes to rest on the entry opening of the glass tube.

Once more in summary, the inventive step was found after quite a few attempts to place the gemstone exactly vertically into the bottom of the semi-molten glass tube by applying a particular vacuum tweezer technique, wherein a cannula is equipped with an end piece that is embossed with a mirrored shape, i.e., a negative section of the relevant shape of the applied gemstone and therefore, with applied vacuum suction, would hold the gem perfectly straight. Moreover, the cannula is equipped with heat-resistant guiding means for the glass tube, either concentric metal spirals, or clips of highly heat-resisting plastics, as e.g. PTFE. The length of the cannula is just a little bit shorter than the depth of the glass tube, minus the size of the gem. Accordingly, when inserted to the hilt of a guiding cone, the gem is perfectly in place.

Other features which are considered as characteristic for the invention are set forth in the appended claims.

Although the invention is illustrated and described herein as embodied in a method and device for encasing gem stones, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
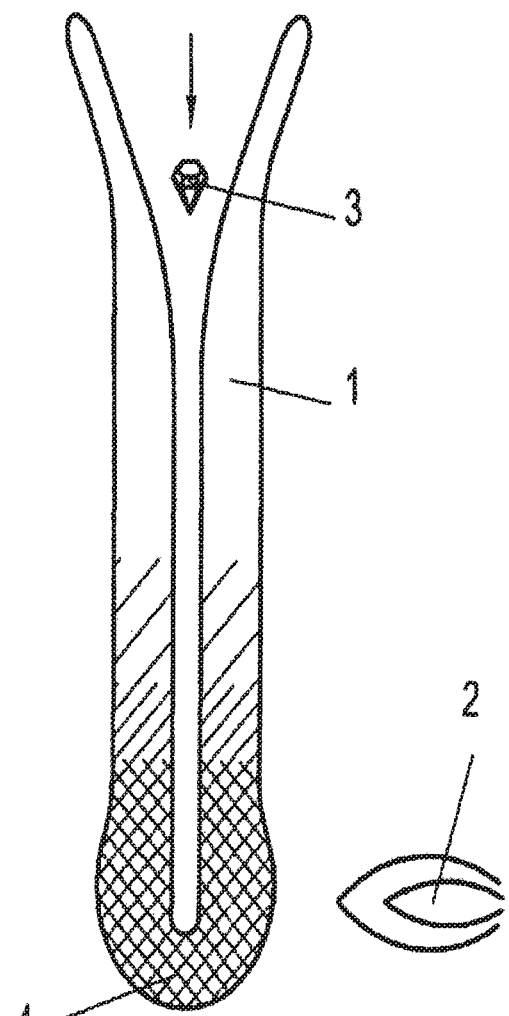
FIG. 1 is a schematic view of a prior art process of incorporating a gemstone in a glass tube.

Referring now to the figures of the drawing in detail and first, particularly, to FIG. 1 thereof, there is shown an illustration of the prior art, as represented by my earlier disclosure WO 2006/128208 A1 (PCT/AT2006/000224). A gemstone 3 is simply dropped into a glass tube 1. The base 4 of the glass tube 1 is heated by a gas flame 2. The final "resting" position of the gemstone is completely arbitrary and its proper, desired effect is not ensured. As noted above, the proper orientation of the gemstone 3 relative to the glass tube is essential so that the best reflective features and the maximum ornamental effect can be achieved.

Figure 2:
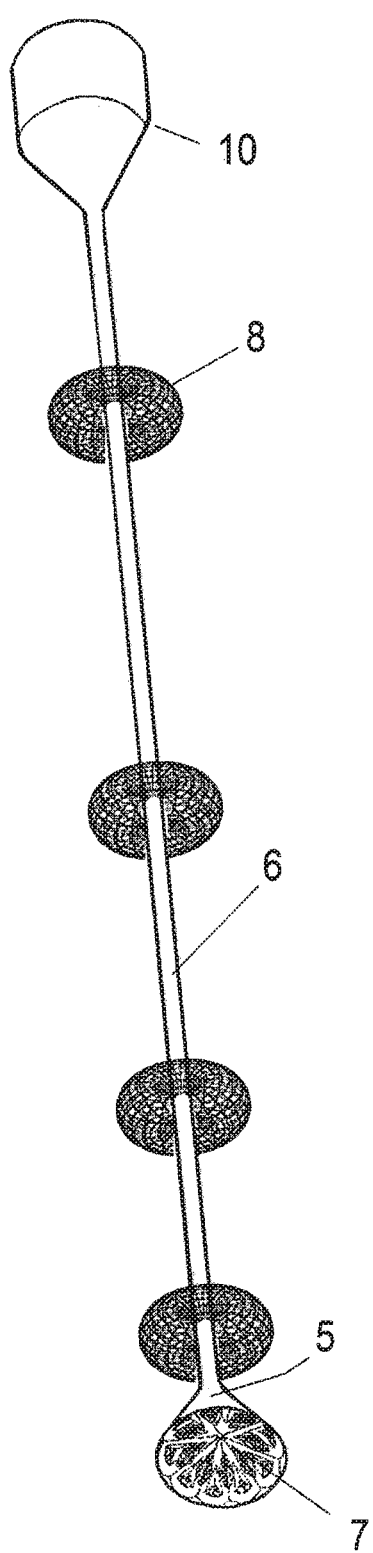
FIG. 2 is a perspective view of a suction cannula for inserting a gemstone into a glass tube.

FIG. 2 shows a device according to the invention with which the desired, defined positioning can be achieved. A suction cannula 6 has an end piece 5 that matches the shape of the gemstone 2. The end piece 5, or head, is milled so that its shape is the shape for a gem and so that the cannula 6 can hold the gem 2 in place. For that purpose, the end piece 5 is formed with a suction opening 7 through which a vacuum is applied through the cannula pipe.

The end piece 5 is formed to have a shape that corresponds to that of the upper portion (i.e., in its final position) of the gemstone 3. In the case of diamonds, one end piece 5 is provided for each carat weight of diamond and for each diamond cut. In the alternative, the shape of the end piece 5 may also be "generalized" so that it will securely and reliably hold any of a variety of gemstones in proper alignment. The end piece 5 must be formed of a material that will withstand the elevated temperatures necessary for the melt-integration of the gemstone 3 into glass. As noted, the end piece 5 is formed with a suction opening 7 in its center which communicates with the central pipe opening of the cannula 6.

In production, the cannula 6 is connected to a vacuum pump. The vacuum suction impacts the gemstone 3 through the cannula 6 and the opening 7. The atmospheric pressure pushes the gemstone 3 against the holding surface of the end piece 5 until the vacuum pump is either disconnected or turned off. It is important, of course, that the gemstone 3 is properly retained until it is properly placed in the heated base 4 of the glass tube 1.

The base of the glass tube 1 is heated to a degree of malleability that allows the gemstone 3 to be pushed into its seating. Once it is seated, the vacuum is interrupted and the cannula 6 with its head piece 5 is withdrawn. At that time, the glass is further heated to fully melt and remove the base 4 with the integrated gemstone 3 from the remaining glass tube 1.

It is critically important in the context that any air bubbles and other "impurity" inclusions be avoided. For that purpose, very clean glass is provided and the gemstone is cleaned in an ultrasound bath prior to its insertion. It is also critically important that the processing temperatures be finely adjusted. Too little heat, of course, renders it nearly impossible to properly insert the gemstone. Too much heat will cause the gemstone 3 to become blind, when it will appear grey. Too much heat will cause air bubbles to be formed.

The temperatures used in the process depend on the type of glass that is used. Typical borosilicate glass, which is typically used in glass-blowing, has a malleable processing temperature at around 1,000° C. (~1830° F.). Soda lime glass (SLG) has a lower processing temperature around 800° C. (~1470° F.).

In a preferred implementation, there is used a borosilicate glass that is resistant to acid, that can take high processing temperatures, and that tends not to form bubbles during processing. The preferred gemstone is diamond and the preferred cut for the diamond is a 58-facet cut. The product is preferably used for pendants, for earrings, for rings, and for bangles.

I have found that the temperatures for the inventive process should be kept to a minimum. That is, best results in terms of the clarity of the resulting product and of the efficiency of the process are achieved by minimizing the processing temperatures.

The cannula 6 is provided with guide elements 8 that guide the cannula 6 inside the glass pipe 1. The guide elements, or guides 8, may be mesh rings, clips, or a helical spiral. The guide elements, or guide element 8, are formed of highly heat-resistant material, such as PTFE (polytetrafluoroethylene, "Teflon"). The heat resistivity of the guides 8 is adapted so that they can safely withstand the temperatures that are necessary for the heating of the glass.

The length of the glass tube 1 and of the cannula 6 are adapted to one another. The gemstone 3 comes to rest in its proper position in the base of the glass tube 1 when the cannula 6 is inserted up to its hilt 10.

Once the gemstone has been placed and the glass of the base 4 has been molten so as to fully encase the gemstone without any air bubble inclusions, the base 4 is separated from the glass pipe 1. The resulting separate piece is a glass blob or graft with the gemstone enclosed. Then a very thin glass stem is attached to the glass blob by melting. Then the product is further processed, depending on its final design. For instance, in order to form a sphere, the further processing resembles that of forming a marble. The glass blob is shaped in a variety of molds, always by rotating. In some cases it may be necessary to attach the glass stem at a different point for further processing. Also, glass will be added or removed from the product during its shaping.

Once the final shape has been reached, such as a sphere, the thin glass stem is removed by melting. At this point, the product is held by way of tweezers so that the remaining material at the point where the stem was attached can be melted.

It a color addition is requested, the product is subjected to a further processing step. After the final shaping, the product is annealed in a lehr to slowly cool down.

The following is a summary list of reference numerals and the corresponding structure used in the above description of the invention:

1 glass tube
2 gas flame
3 gemstone
4 base of glass tube
5 head piece of cannula
6 cannula
7 aspiration opening
8 spacer guide
10 hilt of cannula

The invention claimed is:

1. A method of integrating a gemstone in a glass carrier, the method comprising the following steps:
   providing a glass body with an opening;
   aspirating the gemstone onto a head of a cannula by applying suction at an opposite end and establishing a vacuum at the head of the cannula;
   heating a base of the body of glass to a temperature at which the base becomes malleable;
   inserting the head of the cannula, with the gemstone aspirated thereon, through the opening in the glass body, until an end of the cannula is fully inserted into the glass body, and seating the gemstone in the malleable base;
   further heating the base and separating the base with the gemstone integrated therein from a remaining portion of the glass body.

2. The method according to claim 1, which comprises, subsequent to separating the base, further processing the separated base to form a final product being a glass figure with the gemstone incorporated therein.

3. The method according to claim 2, wherein the glass figure is a sphere with the gemstone centrally disposed inside the sphere.

4. The method according to claim 1, which comprises subsequently to seating the gemstone in the malleable base, interrupting the vacuum at the head of the cannula and withdrawing the head of the cannula without the gemstone.

5. A method of integrating a gemstone in a glass carrier, the method comprising the following steps:
   providing a glass body with an opening;
   providing a cannula, the cannula having a head and a hollow tube;
   wherein the hollow tube has a length substantially equal to a length of said glass body;
   aspirating the gemstone onto the head of the cannula by applying suction at an opposite end and establishing a vacuum at the head of the cannula;
   heating a base of the body of glass to a temperature at which the base becomes malleable;
   inserting the head of the cannula, with the gemstone aspirated thereon, through the opening in the glass body, until the gemstone comes to rest in a proper position in the base of the glass body and seating the gemstone in the malleable base;
   further heating the base and separating the base with the gemstone integrated therein from a remaining portion of the glass body.

6. The method according to claim 5, wherein the cannula is provided with a hilt at a second end opposite of the head of the cannula,
   wherein the hilt comes to rest on an entry opening of the glass body when the end piece is fully inserted into the glass body.

7. The method according to claim 5, wherein the cannula is provided with a plurality of spacers; and
   wherein the spacers guide the cannula with an even distancing from walls of the glass body when inserting the cannula into the glass body.

8. A method of integrating a gemstone in a glass carrier, the method comprising the following steps:
   providing a glass body with an opening;
   aspirating the gemstone onto a head of a cannula by applying suction at an opposite end and establishing a vacuum at the head of the cannula;
   heating a base of the body of glass to a temperature at which the base becomes malleable;
   inserting the head of the cannula, with the gemstone aspirated thereon, through the opening in the glass body, and seating the gemstone in the malleable base;
   subsequently to seating the gemstone in the malleable base, interrupting the vacuum at the head of the cannula and withdrawing the head of the cannula without the gemstone out of the glass body;
   further heating the base and separating the base with the gemstone integrated therein from a remaining portion of the glass body.

* * * * *